United States Patent
Geelen

(10) Patent No.: US 8,532,678 B2
(45) Date of Patent: Sep. 10, 2013

(54) PORTABLE GPS NAVIGATION DEVICE

(75) Inventor: Pieter Geelen, Amsterdam (NL)

(73) Assignee: Tomtom International B.V., Amsterdam (NL)

(*) Notice: Subject to any disclaimer, the term of this patent is extended or adjusted under 35 U.S.C. 154(b) by 1118 days.

(21) Appl. No.: 11/370,428

(22) Filed: Mar. 8, 2006

(65) Prior Publication Data

US 2007/0213092 A1 Sep. 13, 2007

(51) Int. Cl.
 *H04W 24/00* (2009.01)

(52) U.S. Cl.
 USPC ............ 455/457; 455/414.1; 455/414.2; 455/422.1; 455/456.1; 455/41.3

(58) Field of Classification Search
 USPC ........... 455/414.2, 41.2, 456.1, 456.6, 457, 455/456.3, 422.1, 424, 517, 556.1; 71/202, 71/216; 345/810, 2.3; 340/989, 988, 995.21, 340/990, 995.23; 701/207, 213, 208, 202, 701/26, 209, 200, 211, 1, 36; 342/257.06; 715/810, 744
 See application file for complete search history.

(56) References Cited

U.S. PATENT DOCUMENTS

| | | | |
|---|---|---|---|
| 5,046,082 A | 9/1991 | Zicker et al. | |
| 5,727,057 A * | 3/1998 | Emery et al. | 379/201.07 |
| 5,790,800 A | 8/1998 | Gauvin et al. | |
| 5,920,826 A | 7/1999 | Metso et al. | |
| 5,941,930 A * | 8/1999 | Morimoto et al. | 701/532 |
| 6,085,097 A | 7/2000 | Savery et al. | |
| 6,295,449 B1 * | 9/2001 | Westerlage et al. | 455/422.1 |
| 6,317,684 B1 * | 11/2001 | Roeseler et al. | 701/428 |
| 6,360,167 B1 * | 3/2002 | Millington et al. | 701/516 |
| 6,389,278 B1 | 5/2002 | Singh | |
| 6,600,975 B2 * | 7/2003 | Moriguchi et al. | 701/1 |
| 6,701,161 B1 * | 3/2004 | Wendling | 455/556.1 |
| 6,721,404 B1 | 4/2004 | Lashley et al. | |
| 6,735,516 B1 * | 5/2004 | Manson | 701/410 |
| 6,768,942 B1 | 7/2004 | Chojnacki | |
| 6,812,942 B2 * | 11/2004 | Ribak | 345/30 |
| 6,857,016 B1 | 2/2005 | Motoyama et al. | |
| 6,898,521 B2 * | 5/2005 | Yanai | 701/414 |
| 7,013,345 B1 | 3/2006 | Brown et al. | |
| 7,123,933 B2 | 10/2006 | Poor et al. | |
| 7,286,857 B1 | 10/2007 | Walker et al. | |
| 7,426,689 B2 * | 9/2008 | Simonds et al. | 715/234 |

(Continued)

FOREIGN PATENT DOCUMENTS

| | | |
|---|---|---|
| EP | 1298416 | 4/2003 |
| EP | 1387145 | 2/2004 |

(Continued)

OTHER PUBLICATIONS

International Search Report issued Aug. 29, 2007 for International Application No. PCT/EP2007/002151.

(Continued)

*Primary Examiner* — April G Gonzales

(57) ABSTRACT

A portable GPS navigation device displays map information and navigation instructions; the device (a) includes a two-way wireless transceiver operable to connect to a mobile telephone; (b) is operable to enable a user to control one or more functions of the mobile telephone and (c) includes an audio output and a microphone to enable a voice call to be made using the mobile telephone.

46 Claims, 12 Drawing Sheets

(56) References Cited

U.S. PATENT DOCUMENTS

| | | | |
|---|---|---|---|
| 7,468,692 B1* | 12/2008 | Wiegers | 342/357.51 |
| 7,908,080 B2* | 3/2011 | Rowley et al. | 701/423 |
| 2001/0046884 A1 | 11/2001 | Yoshioka | |
| 2002/0032771 A1 | 3/2002 | Gledje | |
| 2002/0055351 A1 | 5/2002 | Elsey et al. | |
| 2002/0085043 A1* | 7/2002 | Ribak | 345/810 |
| 2002/0098831 A1 | 7/2002 | Castell et al. | |
| 2002/0173906 A1* | 11/2002 | Muramatsu | 701/207 |
| 2002/0174360 A1 | 11/2002 | Ikeda | |
| 2002/0196189 A1* | 12/2002 | Choi | 342/457 |
| 2003/0001816 A1 | 1/2003 | Badarneh | |
| 2003/0033214 A1 | 2/2003 | Mikkelsen et al. | |
| 2003/0045275 A1 | 3/2003 | McDonagh et al. | |
| 2003/0065440 A1 | 4/2003 | Oda et al. | |
| 2003/0065784 A1 | 4/2003 | Herrod | |
| 2003/0088511 A1 | 5/2003 | Karboulonis et al. | |
| 2003/0115288 A1 | 6/2003 | Ljubicich et al. | |
| 2003/0139150 A1 | 7/2003 | Rodriguez et al. | |
| 2004/0148097 A1* | 7/2004 | Mouser et al. | 701/207 |
| 2004/0176040 A1 | 9/2004 | Thornton et al. | |
| 2004/0235424 A1 | 11/2004 | Kim | |
| 2005/0097503 A1 | 5/2005 | Zintel et al. | |
| 2005/0136837 A1 | 6/2005 | Nurminen et al. | |
| 2005/0185619 A1 | 8/2005 | Niemela et al. | |
| 2006/0019607 A1 | 1/2006 | Kim | |
| 2006/0128475 A1* | 6/2006 | Vitito | 463/46 |
| 2007/0035412 A1 | 2/2007 | Dvorak et al. | |
| 2007/0150190 A1* | 6/2007 | Riddiford | 701/213 |
| 2007/0185648 A1* | 8/2007 | Gretton | 701/208 |
| 2007/0225902 A1* | 9/2007 | Gretton et al. | 701/202 |
| 2008/0082225 A1* | 4/2008 | Barrett | 701/26 |
| 2008/0109882 A1 | 5/2008 | Mahalal et al. | |
| 2008/0177469 A1* | 7/2008 | Geelen et al. | 701/209 |
| 2009/0143078 A1* | 6/2009 | Tu et al. | 455/456.3 |
| 2009/0163140 A1 | 6/2009 | Packham et al. | |

FOREIGN PATENT DOCUMENTS

| | | |
|---|---|---|
| JP | 2002330100 A | 11/2002 |
| JP | 2002350153 A | 12/2002 |
| JP | 2003106845 A | 4/2003 |
| JP | 2003141691 A | 5/2003 |
| JP | 2003153341 A | 5/2003 |
| JP | 2003283421 A | 10/2003 |
| JP | 2005123696 A | 5/2005 |

OTHER PUBLICATIONS

Parrot CK3000 User Guide, Mar. 5, 2004.
BMW Universal Bluetooth Hands-Free System (ULF) Owners Manual, Jun. 5, 2003.

* cited by examiner

Figure 14

From:7226　　　　　　　　　　　　　　12:03am

Hi Pete, when will you be in the office?

Options　　　　　　　　　　　　　　Done

PORTABLE GPS NAVIGATION DEVICE

BACKGROUND OF THE INVENTION

1. Field of the Invention

This invention relates to a portable GPS navigation device. The navigation device can display travel information and finds particular application as an in-car navigation system.

2. Description of the Prior Art

GPS based navigation devices are well known and are widely employed as in-car navigation devices. Reference may be made to devices that integrate a GPS receiver into a computing device programmed with a map database and that can generate navigation instructions on a display, such as the TomTom Go™ device. These portable, integrated devices are often mounted on or in the dashboard of a vehicle using a suction mount.

Reference may also be made to the Navigator series software from the present assignee, TomTom B.V. This is software that, when running on a PDA (such as a Compaq iPaq™) connected to an external GPS receiver, enables a user to input to the PDA a start and destination address. The software then calculates the best route between the two end-points and displays instructions on how to navigate that route. By using the positional information derived from the GPS receiver, the software can determine at regular intervals the position of the PDA (typically mounted on the dashboard of a vehicle) and can display the current position of the vehicle on a map and display (and speak) appropriate navigation instructions (e.g. 'turn left in 100 m'). Graphics depicting the actions to be accomplished (e.g. a left arrow indicating a left turn ahead) can be displayed in a status bar and also be superimposed over the applicable junctions/turnings etc in the roads shown in the map itself.

The term 'navigation device' refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

The present invention provides a 'hands-free' mobile telephone capability: in many countries and also states in the USA, it is illegal to drive a vehicle whilst holding a mobile telephone; instead, the telephone must be used without the driver having to hold or directly manipulate any of the controls of the telephone itself. One common approach is for a driver to use a headset that communicates with a mobile telephone over a short range wireless network, such as Bluetooth™. It is also possible to integrate hands-free functionality into a vehicle's sound system; this requires permanent mounting of a microphone near the driver and either a mobile telephone permanently mounted in the car or a wire or wire-based connection from the sound system to the mobile telephone. Such systems can integrate with the functionality of the sound system; for example, automatically muting the vehicle radio if a voice call comes in. But they are very costly.

SUMMARY OF THE INVENTION

The invention is a portable GPS navigation device displaying map information and navigation instructions, wherein the device (a) includes a two-way wireless transceiver operable to connect to a mobile telephone; (b) is operable to enable a user to control one or more functions of the mobile telephone and (c) includes an audio output and a microphone to enable a voice call to be made using the mobile telephone.

In one implementation, the present invention is in essence a hands-free-kit deployed inside a GPS navigation device. The hands-free-kit links to a mobile telephone (e.g. wirelessly via Bluetooth, or in any other way), and one of the defining aspects is that when a phone call (also described as a 'voice call' ion this specification) comes in, the user can have his phone conversation without the need to keep the phone to his ear and mouth. As noted earlier, the usual way is to have a microphone capable of capturing what the user says from a distance of at least a meter, to have a speaker with enough volume to be audible from at least one metre or to broadcast the audio to a headset, etc. However, integration of a hands-free-kit into a vehicle GPS navigation device, especially a portable device that can readily be mounted in the vehicle (typically against the windshield using a suction mount) and dismounted, is not known.

By integrating the hands-free functionality into the navigation device, several advantages arise. Principally, the navigation device already requires the user to rapidly absorb graphical information and to enter control inputs (typically by selecting large icons using a touch screen display). By using the same interaction approach and the same device to operate the mobile telephone that the user is already familiar with when driving, the extra cognitive load imposed by use of a mobile telephone is minimised. This is a very important attribute of any safe system that is meant to be used whilst the user is driving: where the cognitive load exceeds a threshold, then an instinctive phenomenon called gaze aversion occurs—the driver involuntarily looks away from the road for a moment. This is clearly very hazardous.

But requiring the user to view even a very simple navigation system such as the TomTom Go, and at the same time operate an entirely different item of electronic equipment with a totally different user interaction design, such as a conventional headset based hands-free mobile telephone kit, could, perhaps surprisingly, lead in some cases to sufficient cognitive load to materially increase the chance of a potentially dangerous gaze aversion event. Hence, the present invention is predicated on the insight that integrating a hands-free mobile telephony function into an in-vehicle GPS navigation device is not only more convenient for a user (since it requires only the single GPS navigation device to perform both navigation and hands-free functionality) but is also significantly safer as well. This represents a very different mindset from that previously prevalent in the field of GPS navigation devices and hands-free connectivity.

These and other features of the invention will be more fully understood by reference to the following drawings.

BRIEF DESCRIPTION OF THE DRAWINGS

FIG. 14 shows how a typical text message is displayed.

DETAILED DESCRIPTION

During the course of this description, like numbers will be used to identify like elements according to the different views that illustrate the invention.

System Overview

The present invention is implemented in a navigation device from TomTom B.V. called Go™. Go deploys navigation software called Navigator and has an internal GPS receiver; (Navigator software can also run on a touch screen (i.e. stylus controlled) Pocket PC powered PDA device, such as the Compaq iPaq. It then provides a GPS based navigation system when the PDA is coupled with a GPS receiver. The combined PDA and GPS receiver system is designed to be used as an in-vehicle navigation system).

The navigation device may implement any kind of position sensing technology; it is not limited to NAVSTAR GPS; it can hence be implemented using other kinds of GNSS (global navigation satellite system) such as the European Galileo system.

Figure 1:
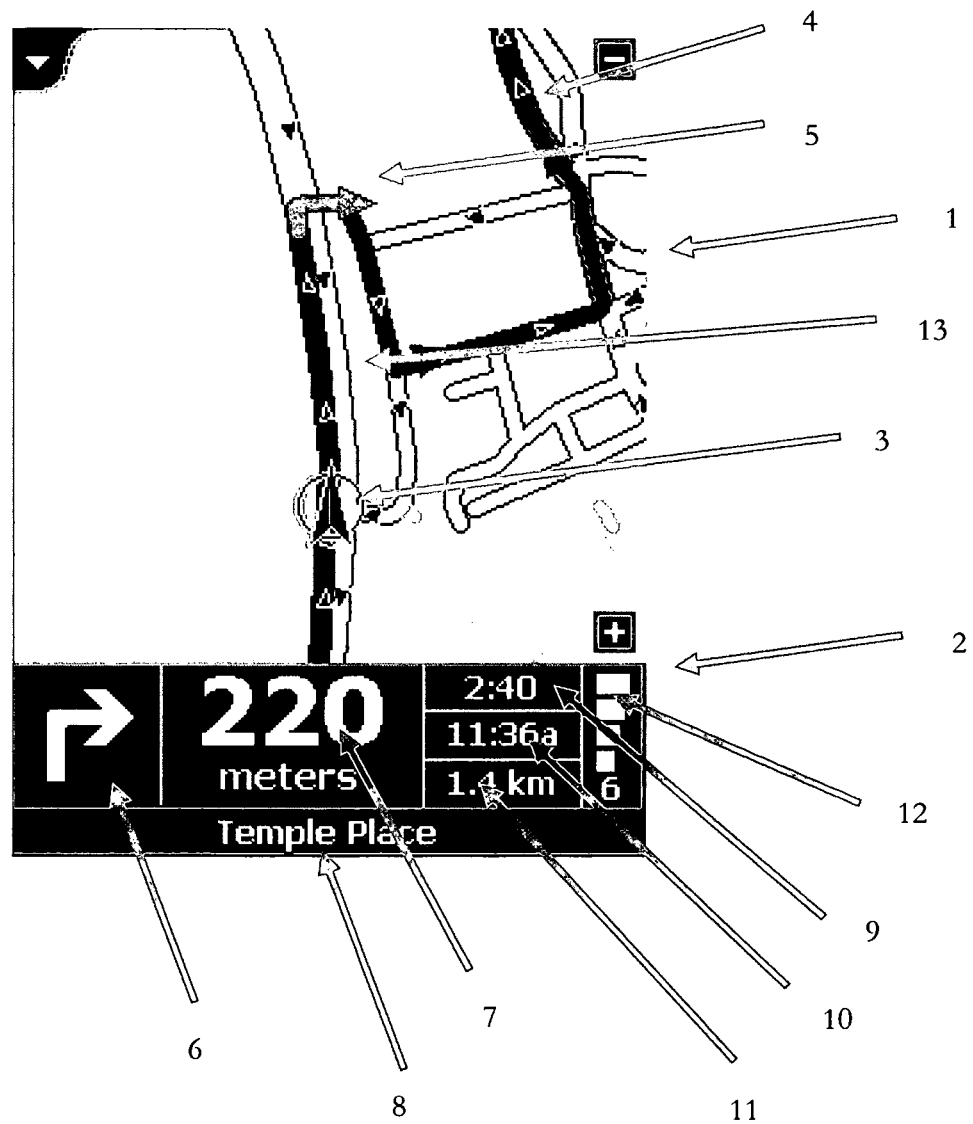
FIG. 1 is a screen shot from a navigation device; the screen shot shows a plan map view and a status bar running along the bottom of the display.
Figure 2:
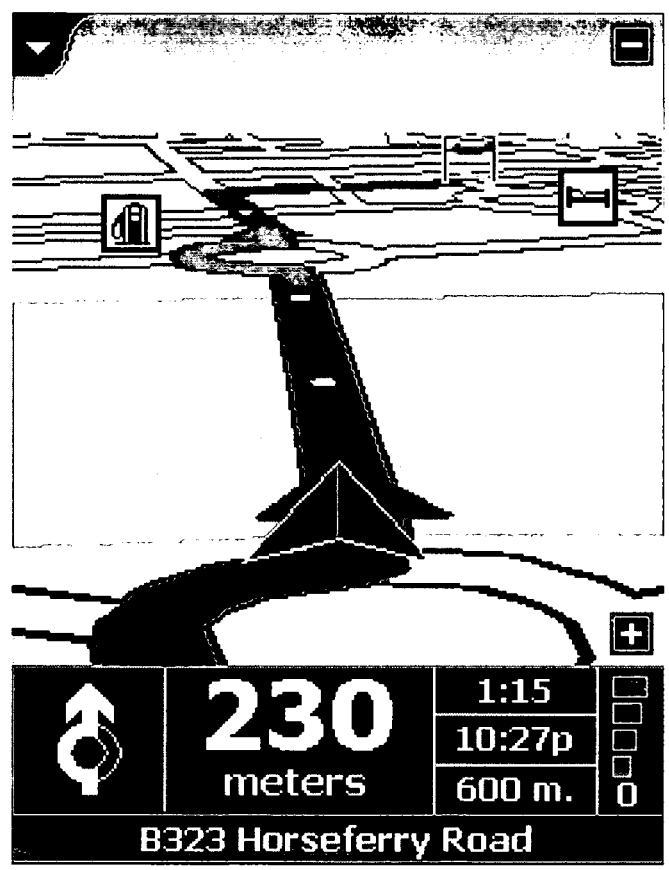
FIG. 2 is a screen shot from the navigation device implementing a 3-D view.

Navigation software, when running on the TomTom Go, results in a navigation device that causes the normal navigation mode screen shown in FIG. 1 to be displayed. This view provides driving instructions using a combination of text, symbols, voice guidance and a moving map. Key user interface elements are the following: a 2-D map 1 occupies most of the screen. The map shows the user's car and its immediate surroundings, rotated in such a way that the direction in which the car is moving is always "up". Running across the bottom quarter of the screen is the status bar 2. The current location of the device, as the device itself determines using conventional GPS location finding and its orientation (as inferred from its direction of travel) is depicted by an arrow 3. The route calculated by the device (using route calculation algorithms stored in device memory as applied to map data stored in a map database in device memory) is shown as darkened path 4 superimposed with arrows giving the travel direction. On the darkened path 4, all major actions (e.g. turning corners, crossroads, roundabouts etc.) are schematically depicted by arrows 5 overlaying the path 4. The status bar 2 also includes at its left hand side a schematic 6 depicting the next action (here, a right turn). The status bar 2 also shows the distance to the next action (i.e. the right turn—here the distance is 220 meters) as extracted from a database of the entire route calculated by the device (i.e. a list of all roads and related actions defining the route to be taken). Status bar 2 also shows the name of the next road (in some cases, the name of the current road) 8, the estimated time before arrival 9 (here 2 minutes and 40 seconds), the actual estimated arrival time 10 (11.36 am) and the distance to the destination 11 (1.4 Km). The GPS signal strength is shown in a mobile-phone style signal strength indicator 12. A 3-D map view mode is also possible, as shown in FIG. 2.

If the user touches the screen 13, then a navigation screen menu is displayed; from this menu, other core navigation functions within the Navigator application can be initiated or controlled. Allowing core navigation functions to be selected from a menu screen that is itself very readily called up (e.g. one step away from the map display to the menu screen) greatly simplifies the user interaction and makes it faster and easier. The hands-free functionality can also be rapidly and easily accessed, as will be explained later, using large colour graphical icons that can be reliably selected using a finger touch.

Figure 3:
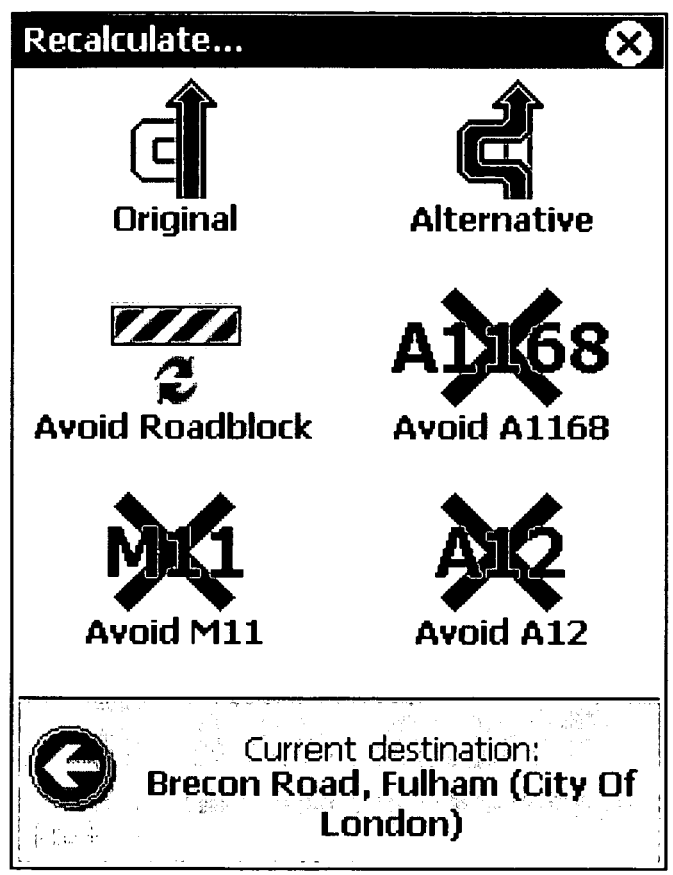
FIG. 3 is a screen shot from the navigation device showing a navigation menu.
Figure 9:
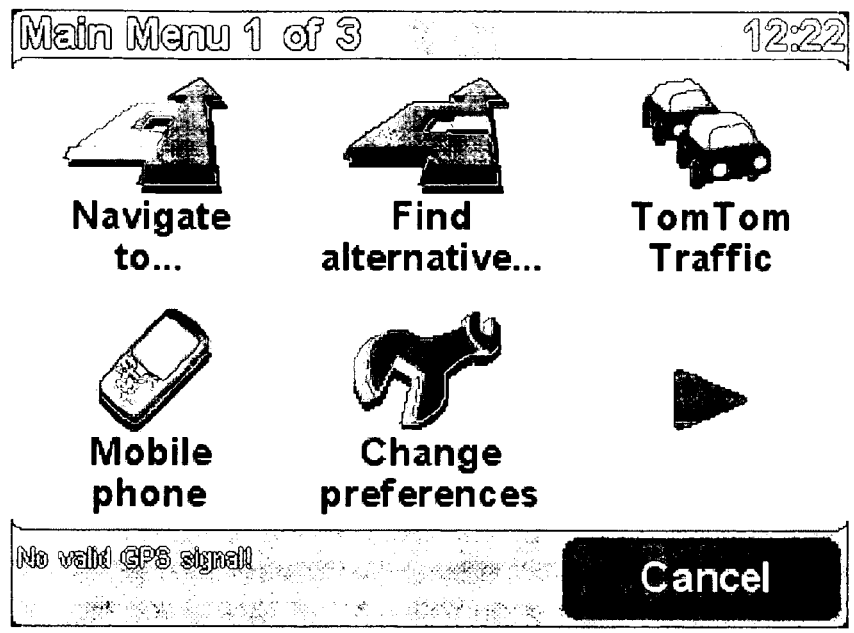
FIG. 9 is the main menu of the navigation device.

The area of the touch zone which needs to be touched by a user is far larger than in most stylus based touch screen systems. It is designed to be large enough to be reliably selected by a single finger without special accuracy; i.e. to mimic the real-life conditions for a driver when controlling a vehicle; he or she will have little time to look at a highly detailed screen with small control icons, and still less time to accurately press one of those small control icons. Hence, using a very large touch screen area associated with a given soft key (or hidden soft key, as in the centre of the screen 13) is a deliberate design feature of this implementation. Unlike other stylus based applications, this design feature is consistently deployed throughout the Go device to select core functions that are likely to be needed by a driver whilst actually driving. Hence, whenever the user is given the choice of selecting on-screen icons (e.g. control icons, or keys of a virtual keyboard to enter a destination address, for example), then the design of those icons/keys is kept simple and the associated touch screen zones is expanded to such a size that each icon/key can unambiguously be finger selected. In practice, the associated touch screen zone will be of the order of at least 0.7 cm$^2$ and will typically be a square zone. In normal navigation mode, the device displays a map. Touching the map (i.e. the touch sensitive display) once (or twice in a different implementation) near to the screen centre (or any part of the screen in another implementation) will then call up a main navigation menu (see FIG. 3) with large icons corresponding to various navigation functions, such as the option to calculate an alternative route, and re-calculate the route so as to avoid the next section of road (useful when faced with an obstruction or heavy congestion); or recalculate the route so as to avoid specific, listed roads. FIG. 3 is a simplified main menu used in a prior art navigation device with no hands-free function. FIG. 9 is the main menu of a Go device that does deploy hands-free functionality. It will be described in detail below.

The actual physical structure of the Go device is fundamentally different from a conventional embedded device in terms of the memory architecture (see the System Architecture section below). At a high level it is similar though: memory stores the route calculation algorithms, map database and user interface software; a microprocessor interprets and processes user input (e.g. using a device touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination in the normal manner into the navigation software running on the Go device using a virtual keyboard. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of the Go device (or is otherwise accessed by it) running on the Go device as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the navigation software in the Go device. The algorithms are applied to score large numbers of potential different routes. The navigation software then evaluates them against the user defined criteria (or device defaults), such as a full mode scan, with scenic route, past museums, and no speed camera. The route which best meets the defined criteria is then calculated by a processor in the Go device and then stored in a database in RAM as a sequence of vectors, road names and actions to be done at vector end-points (e.g. corresponding to pre-determined distances along each road of the route, such as after 100 meters, turn left into street x).

Figure 4A:
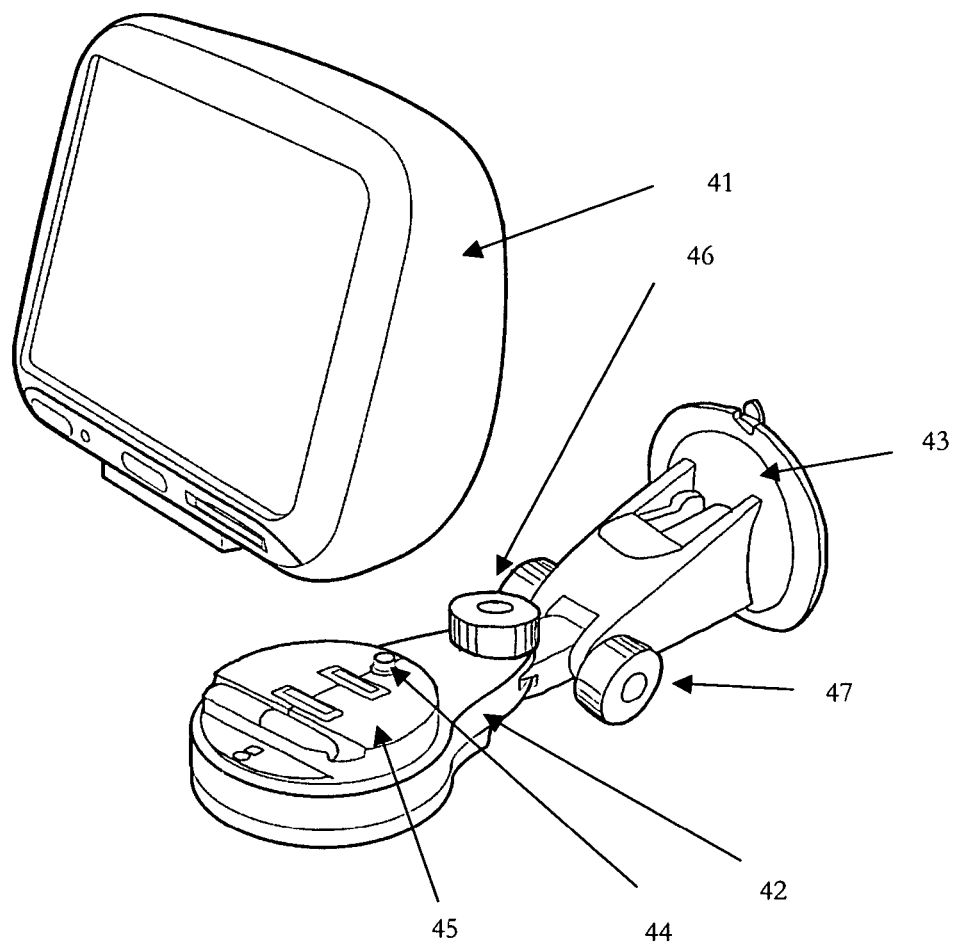
FIGS. 4A and 4B are perspective views of the navigation device and dock according to the present invention.
Figure 4B:
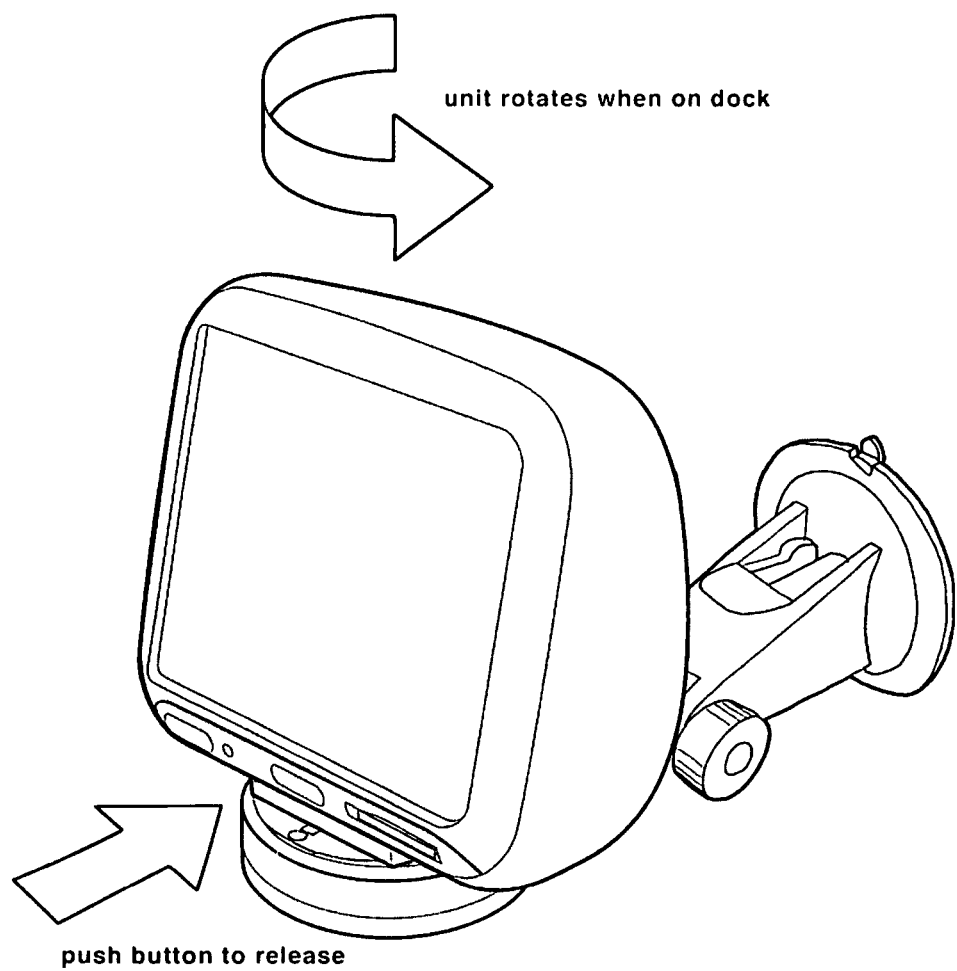

FIGS. 4A and 4B are perspective views of the actual Go implementation of a navigation device and dock. The Go navigation device is a unit 41 that includes display, internal GPS receiver, microprocessor, power supply and memory systems. The Go device 41 sits on a docking platform 45; the platform 45 is rotatably mounted an arm 42 that can pivot horizontally about bolt post 46. The arm 42 can also pivot vertically about posts 47, which pass through apertures in a mounting arm which has a large suction cup 43 at one end. As shown in FIG. 4B, the device 41 and docking platform 45 can rotate together; this combined with the vertical and horizontal degrees of movement allowed by posts 46 and 47 enables the device, when secured to the car dashboard using a large suction cup 43, to be perfectly positioned for a driver.

One detail of the design is that, whilst the device 41 includes an internal GPS receiver with an internal aerial, in some circumstances it is desirable to use an external GPS aerial (e.g. roof mounted). Normally, an external aerial would connect to a navigation device using a co-axial cable with a socket that plugs directly into the navigation device. But with the present system, the co-axial cable is fed directly to a RF aerial socket 44, positioned on the docking platform 45. When the navigation device is mounted correctly on the docking platform 45, a RF connector internal to the device 41 engages the aerial socket 44 to feed RF signals from the external aerial to the device circuitry. If the driver rotates the device, then the device maintains engagement with the aerial socket 44 since socket 44 is part of the docking platform 45.

System Architecture

Figure 5:
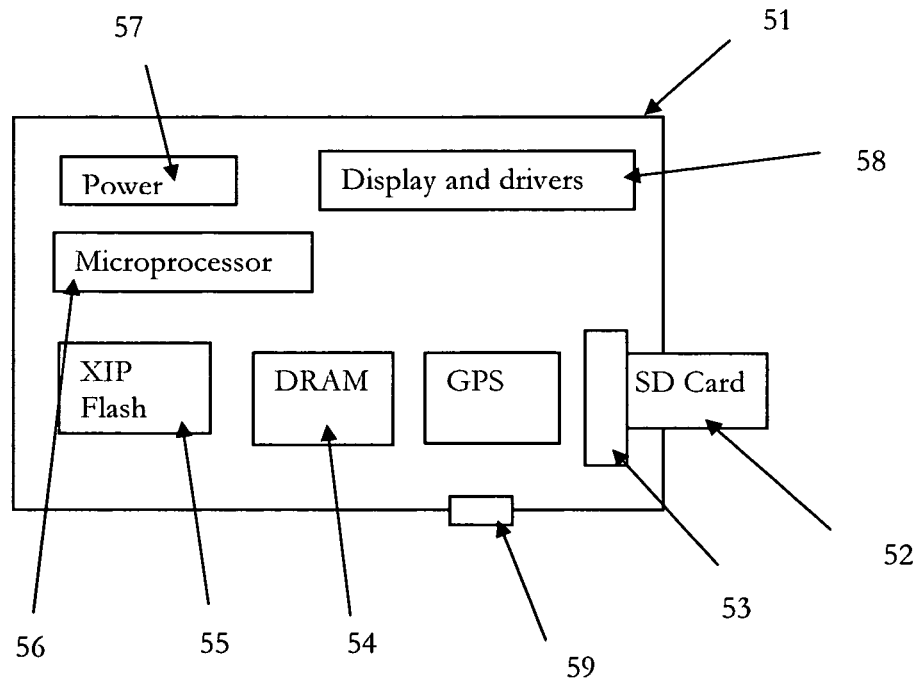
FIG. 5 is a schematic view of the system architecture for the navigation device.

In contrast to conventional embedded devices which execute all the OS and application code in place from a large mask ROM or Flash device, an implementation of the present invention uses a new memory architecture. FIG. 5 schematically depicts the device. The device, indicated generally at 51, includes conventional items such as a microprocessor 56, power source 57, display and related drivers 58. In addition, it includes a SD card reader 53; a SD card 52 is shown slotted into position. The device 51 has internal DRAM 54 and XIP Flash 55 and.

The device hence uses three different forms of memory:

1. A small amount of internal XIP (execute In Place) Flash ROM 55. This is analogous to the PC's BIOS ROM and will only contain a proprietary boot loader, $E^2$ emulation (for UID and manufacturing data) and splash screen bit maps. This is estimated to be 256 KB in size and would be on a slow 8 bit wide SRAM interface.
2. The main system RAM (or DRAM) memory 54, this is analogous to the PC's main memory (RAM). This will be where all the main code executes from as well as providing the video RAM and workspace for the OS and applications. Note: No persistent user data will be stored in the main system RAM (like a PC) i.e. there will be no "Ram drive". This RAM will be exclusively connected to a 32 bit 100 MHz synchronous high-speed bus.
3. Non-volatile storage, analogous to the PC's hard disk. This is implemented as removable NAND flash based SD cards 52. These devices do not support XIP. All the OS, application, settings files and map data will be permanently stored on SD cards.

On boot up, the proprietary boot loader 55 will prompt for the user to insert the supplied SD card 52. When this is done, the device will copy a special system file from the SD card 52 into RAM 54. This file will contain the Operating System and navigation application. Once this is complete, control will be passed to the application. The application then starts and accesses non-volatile data e.g. maps from the SD card 52.

When the device is subsequently switched off, the RAM 54 contents is preserved so this boot up procedure only occurs the first time the device is used.

Figure 6:
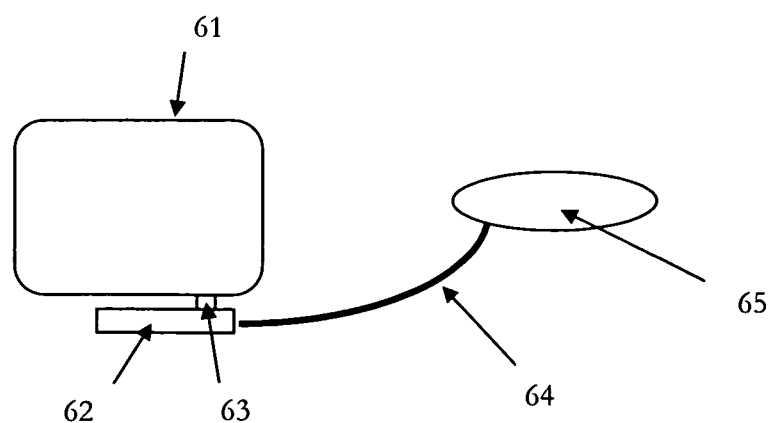
FIG. 6 is a schematic view of the navigation device, dock and external GSP aerial.

Device 51 also includes a GPS receiver with integral antenna; a RF connector 59 for taking in a RF signal from an external aerial is also provided. This is shown schematically in FIG. 6: the navigation device 61 is mounted on docking platform 62; as noted earlier, docking platform 62 includes a RF connector 63 that engages with the RF connector in the device 61 to pass RF signals from GPS satellites to the device 61. An external aerial 65 is connected via co-axial RF cable 64 to the connector on the platform 63. In this way, a user merely has to dock the navigation device onto the platform for an automatic connection to any external aerial to be made. There is no need to laboriously plug in a RF cable directly into the navigation device. Although Go has an internal GPS aerial, an external aerial is sometimes necessary because certain kinds of windscreen glass (e.g. with special coatings) may absorb the signals sent from the GPS satellites.

The following other signals are also connected via the dock to the navigation device:
1. Power from the Vehicle
2. A signal to automatically mute the car audio system during a spoken command
3. A signal to switch on and off the device automatically with the vehicles ignition switch or key 4. Audio output signals to play spoken commands on the vehicles audio system.

Hands-Free Mobile Telephone Function

A user with a Bluetooth-capable mobile phone can use the TomTom GO as a hands-free car kit. Although some functions are dependent on the mobile telephone's capabilities, the user should usually be able to:

Accept incoming calls on the TomTom GO screen with a single tap of the screen.

See that a new SMS message has arrived and read its contents, again with a single tap.

Dial out, using contact details retrieved from the phone's SIM card.

Get his/her call history, contact phone numbers and SMS messages from your phone.

Figure 7:
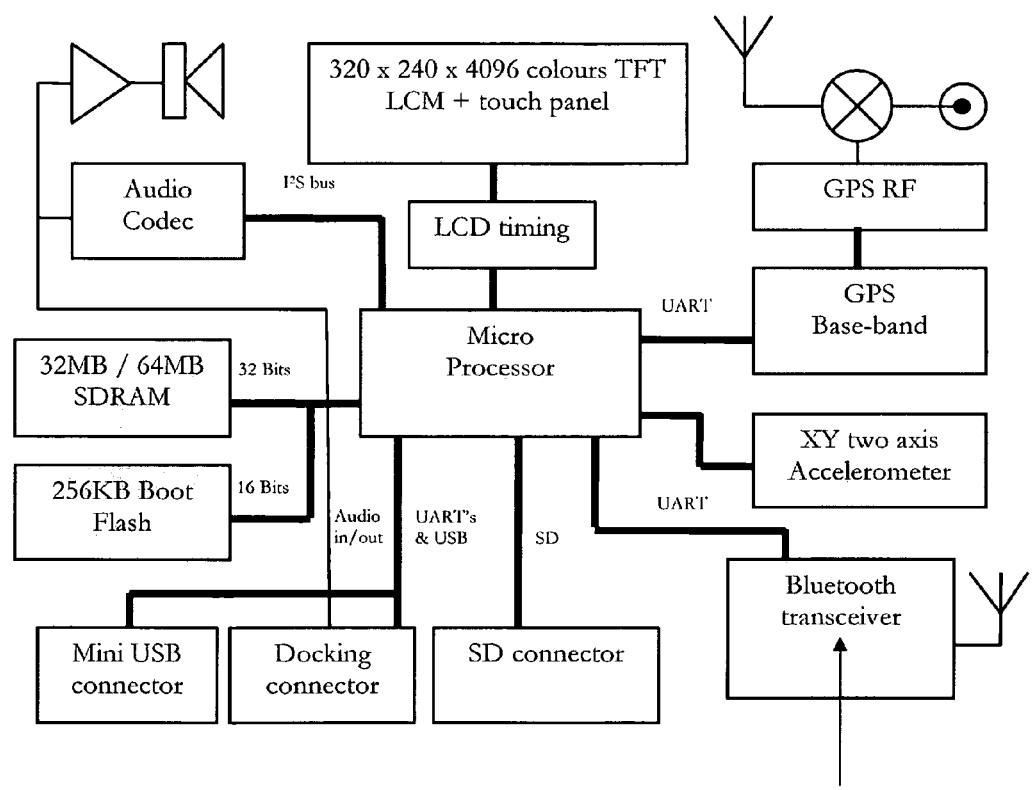
FIG. 7 is a block diagram of components in the navigation device.
Figure 8:
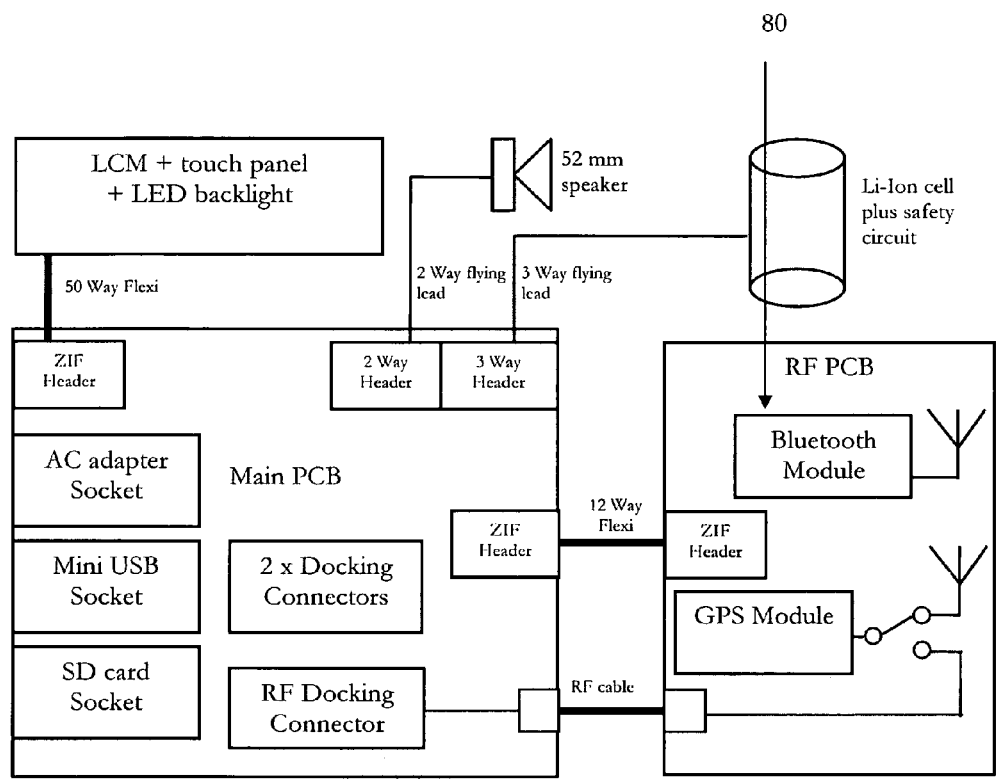
FIG. 8 is a diagram of the electrical subassemblies in the FIG. 7 navigation device.

FIG. 7 is a block diagram of the Go device. For hands-free functionality, the Bluetooth transceiver 70 is critical. FIG. 8 shows the main electrical sub-assemblies. The Bluetooth transceiver is at 80. Appendix 1 is the Go product specification and provides more details.

The very first time TomTom GO is used with a mobile telephone, there are a few steps needed to 'pair' the two devices, i.e. make a connection. First, the user chooses the 'Mobile phone' icon to get started by touching that icon. This is on the main menu, as shown in FIG. 9. The main menu is reached by touching anywhere on the screen when in normal navigation mode—i.e. showing the current position of the vehicle and the nearby roads.

Figure 10:
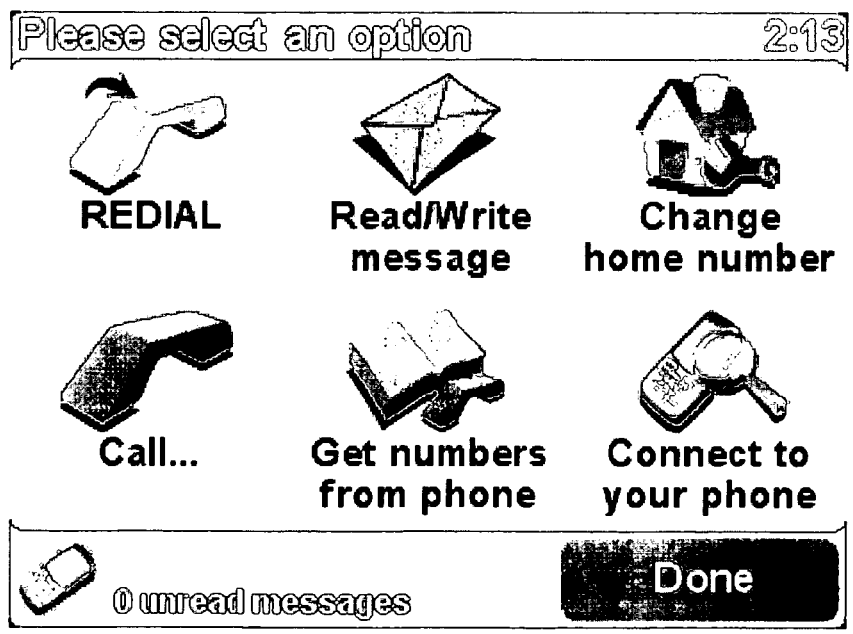
FIG. 10 is the main hands-free menu of the device.

The next level in the menu is then reached; this is the main hands-free menu and it includes a 'Connect to your phone' icon and is shown at FIG. 10. The user selects this and TomTom GO will search for mobile phones. The user then picks his/her phone from the list displayed. When prompted to connect, the user enters a pass code (password) of '0000' on the phone. The user will then be asked to set up a wireless Internet connection (needed if the user wants to use TomTom PLUS services, which give real time traffic information to the device over the phone's GPRS link). Finally, the user can copy his phone book to the TomTom GO. One cannot use hands-free features while this is happening.

The hands-free functions can be accessed directly using the FIG. 10 main hands-free menu. The user chooses 'Mobile phone' from the main menu (FIG. 9) to see this hands-free menu. Note that the number of unread SMS messages is shown at the bottom of every phone-related screen. Note also that the connection to the user's phone is also used when communicating with the Internet-based TomTom PLUS service using GPRS; these supply real time traffic information to the Go device.

Making a call is done as follows: The user touches the 'Call' icon to bring up the Call menu, shown in FIG. 11. The user taps on the 'Home' icon to call whichever number has been set as the home number, for convenience. If this is greyed out, it just means that the user has not yet set a number as 'home'. The user taps on the 'Number' icon to make a hands-free call. The user taps in the number needed using the on-screen keypad.

The user taps on the 'Phonebook entry' icon if he knows that the number needed is already in TomTom GO's phonebook (because it has already been retrieved from his phone or SIM card memory).

The user taps on the 'Point of interest' icon if he needs to call the number associated with a local Point Of Interest. Many built-in POIs have a phone number listed and this is a very quick way of getting in touch with them. For example, the user might call ahead to a tourist attraction to check whether it is open. POIs with an associated phone number are shown with a green phone icon behind them.

Figure 11:
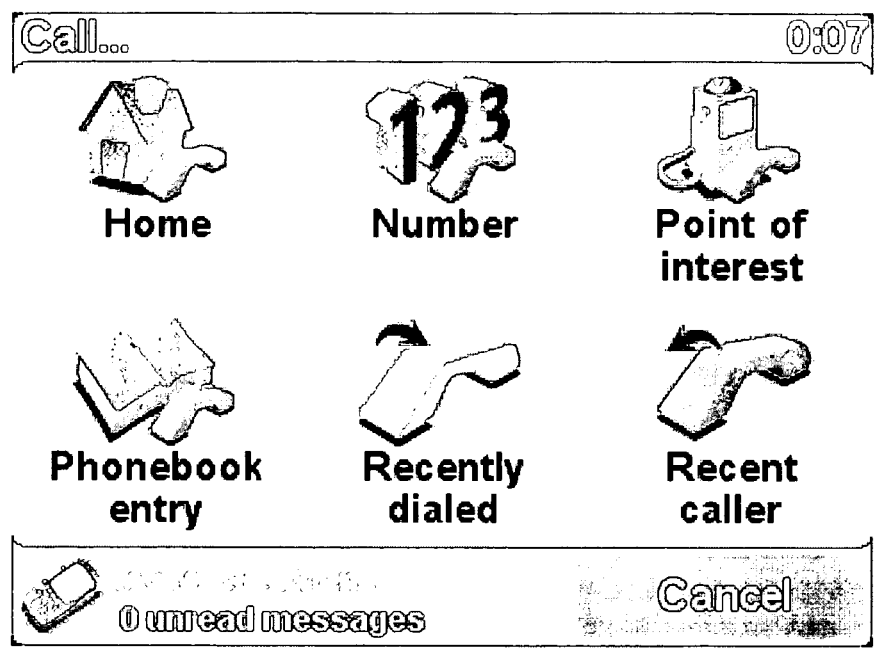
FIG. 11 is the main 'Call' menu reached from the main hands-free menu.

The Call menu FIG. 11 also includes the self-explanatory 'Recently dialled', 'Recent caller' and 'Home' icons.

'Redial', on the main hands-free menu FIG. 10, simply redials the last number that was called.

Figure 12:
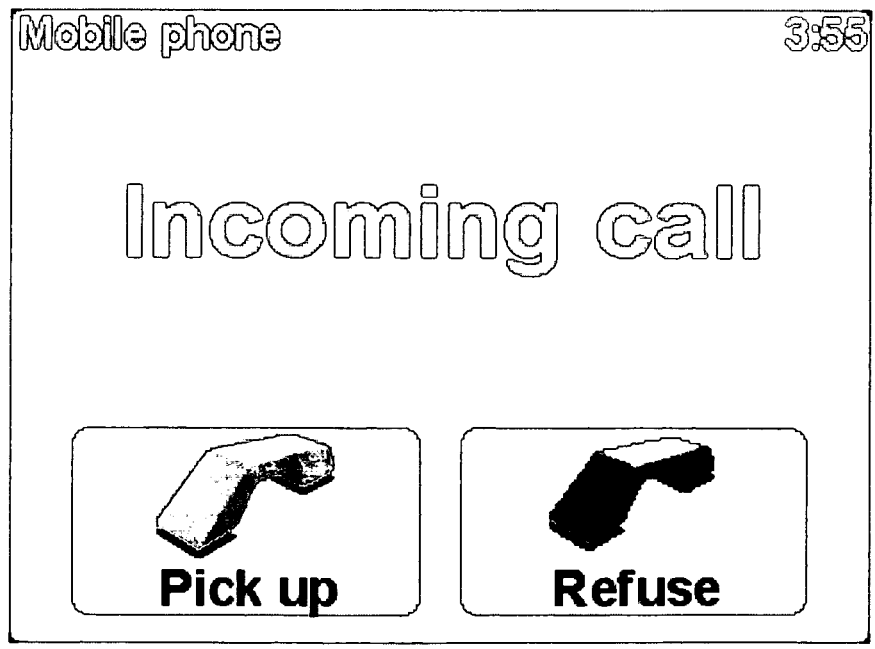
FIG. 12 shows the display of the device when there is an incoming call.

If someone calls the user's mobile telephone during navigation, the user is able to pick up the call with a single tap on a very large 'Pick Up' icon, shown at FIG. 12:

Text messaging is also supported. The user chooses 'Read/write message' from the FIG. 10 main menu to open up the main Messaging menu, FIG. 13. He then chooses the 'Read inbox messages' icon to browse through text messages that have already been received. When a new message arrives at any time, an icon is shown in the top-left corner of the navigation view. Tapping on this will open the message, without having to use this menu option; a typical message format is shown at FIG. 14; the text is far larger and clearer than would be possible on the small screen of a mobile telephone. The user can tap on to quickly 'Call sender', 'Reply to message' or 'Forward message'.

Figure 13:
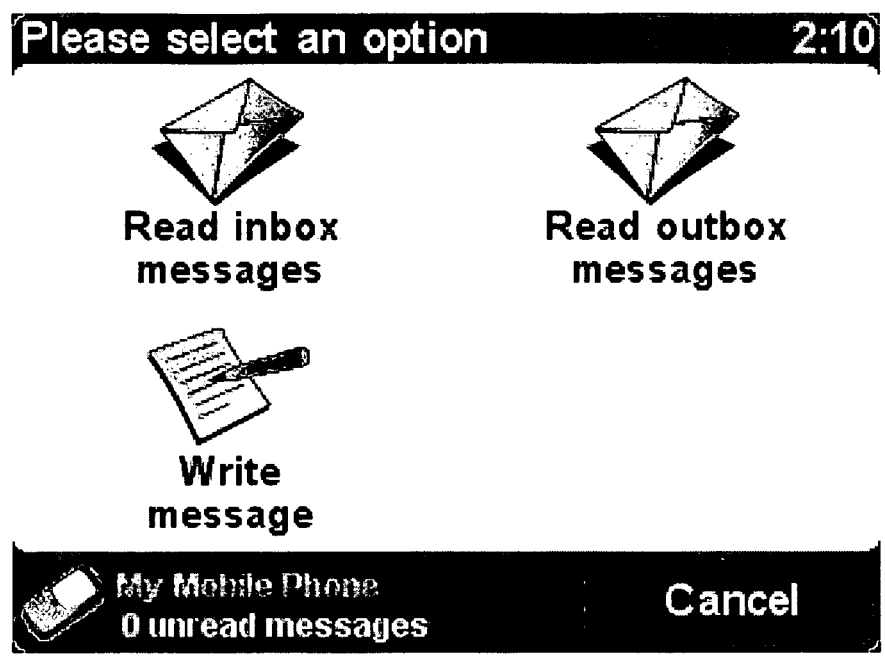
FIG. 13 shows the main messaging menu.

He can choose 'Read outbox messages' in the main messaging menu FIG. 13 to browse through messages that are waiting to be (or have been) sent.

He can choose 'Write message' to create a new message, with a similar choice of destination numbers as when placing a call.

Other phone functions include the following: In order to place calls and create text messages easily and conveniently, the user should use the 'Get numbers from phone' icon from the FIG. 10 main hands-free menu to copy the contact numbers from the Bluetooth mobile phone into the memory of the TomTom GO. The user can use 'Change home number' on the FIG. 10 main hands-free menu to enter a specific number (or pick from recent callers or recently-dialled numbers) as your 'home'.

Summary of Hands-Free Kit Functionality

As noted above, the key feature is that we take a GPS navigation device displaying map information and navigation instructions; the device includes a two-way wireless transceiver operable to connect to a mobile telephone (such as Bluetooth or similar or an evolution of that standard). This kind of device will typically have a speaker or some other form of audio output. We modify this device so that it is operable to enable a user to control one or more functions of the mobile telephone; we include a microphone in the device so that, in combination with the audio output, the user/driver can conduct a voice call using the device, but with voice data being sent over a WAN (typically the GSM cellular network, or an equivalent, update, enhancement such as GPRS, 3G, 4G etc. or indeed an entirely new form of mobile wireless communications) via the mobile telephone.

The navigation device itself already includes a high quality colour display capable of showing bold and clear icons used to control navigation functions of the device. We re-use the computational and graphics capabilities of the device by making it operable to display one or more graphical icons that the user can select to control the function or functions of the mobile telephone. Where the display is a touch screen display, then it shows one or more icons that, when selected by a touch action (e.g. a single touch, or in some cases a double touch), causes a control signal to be sent to the mobile telephone. Examples are that the device displays an icon that, when selected by a touch action, causes one of any of the following:

an incoming voice call to be answered.

a voice call to be ended.

a text message to be displayed.

opens a phonebook application on the device which the user can search for a required number using a keyboard shown on the display. There can be a further icon that, when selected by a touch action, causes a number located in the phone book application to be sent to the mobile telephone and automatically dialled.

a pre-stored 'home' telephone number of the user to be automatically sent to the mobile telephone and dialled.

an on-screen keyboard to be shown, into which a user can enter a telephone number to be dialled.

the user to be enabled to search, select or call the telephone number of a local point of interest (POI).

By allowing these functions to be selected/initiated by the user touching large, graphical icons shown on a clear colour display, these actions can be performed reliably and comfortably by a car driver. The fact that these actions are performed on a device that the driver regularly interacts with whilst driving (even if the interaction is merely visual—looking at the screen—or sonic—listening to voice guidance instructions) makes the interaction process significantly easier and hence safer than the alternative of using a totally separate item of hands-free kit (such as a headset). But clearly, the driver has to use care and discretion when using any of these functions when actually driving. The device can aid this process by for example disabling some functions if the vehicle is driving above a certain speed; hence simple acts like answering an incoming voice call may be allowed up to 60 mph, but prohibited above that. More complex acts, such as entering a telephone number to be dialled, may be prohibited at any vehicle speed at all—i.e. they can only be activated whilst stationary. A voice prompt could provide a spoken explanation of disablement, requesting that the driver pull-over and stop the vehicle. Gaze aversion is a real and significant instinctive response to cognitive over-load and the present invention significantly reduces the risk of this happening.

Driving safety is also directly supported by other cognitive load reduction techniques. For example:

during a voice call, voice navigation instructions from the device are replaced by beeps (i.e. some simple, non-distracting notification) op completely suppressed.

during a voice call, voice navigation instructions from the device are suppressed.

during a voice call, music that is being played back on the device speaker (assuming it includes a music playback function (CD, MP3, radio etc.) is altered in one of the following ways: paused; or the music volume is reduced to a lower volume; or the music volume is reduced to zero, with the music continuing.

during a voice call, the graphical information shown on the display is simplified. For example, instead of a 3D moving-map display, large simple navigation arrows are shown.

during a voice call, an indicator is shown in the display to indicate that a phone call is in progress. Touching the indicator will end the voice call. Touching the indicator could instead cause a phone-related menu to be displayed. The phone related menu offers one or more of the following options: hang up, change the sound volume, transfer the phone audio back to the phone, so that sound comes from the normal mobile telephone speaker instead of the device speaker.

during a voice call, a "mute audio" signal is output by the device to an external audio system, with the effect that the external audio system dims, or reduces volume, or pauses during the phone conversation.

during a voice call, the volume control of the device, normally used to specify the volume of the driving instructions, can be used to influence the volume of the phone conversation.

when a phone call comes in, an "incoming call" ringtone is played on the device, either instead of or in addition to the "incoming call" action of the mobile telephone phone.

Other enhancements are that the device can automatically display details about the incoming call. The details can include one or more of: the phone number of the caller; the caller name (e.g. by matching the number with a list of names and numbers that is available either on the phone or on the device); other information (business/private, home/mobile etc.) that can be retrieved or displayed based on the number or other information available about the incoming phone call. Audible information can be provided based on this information; this could be generated using computer-generated speech synthesis.

The device can also automatically accept an incoming voice call after a pre-determined number of seconds, or a pre-determined number of "rings". It can also show on the display a location linked to a caller, and to allow that location to be used as a new navigation destination. This location can be on a map—e.g. the navigation map generated by the device. The location can be automatically added to a database running on the device (or indeed running somewhere else) for later use in a navigation application. The location linked to the caller can be one or more of: (a) part of the information about the caller, (b) a location stored in a database and retrieved by using the number or name of the caller as key, this database being on the phone, on the navigation device, or accessible via on-line services, (c) retrievable by request to e.g. the mobile telephone operator.

The device also supports data message functionality (e.g. SMS, MMS, or enhancements, successors etc. to these standards—any kind of text or media based message or information or data content that can be used by the device or the driver). For example, when a SMS data message is received by the mobile telephone, the mobile telephone sends on that data message to the device. An indicator appears in the display to indicate receipt that an SMS arrived. This can be a graphical icon, text based notification or a warning sound or a ringtone (or any other pre-recorded sound fragment) played over the audio output of the device. The device can also use computer-generated speech to read out information relating to the message, including one or more of the name of the sender; the content of the message.

The user can also create a data message in which part of the content is generated automatically by navigation software running on the device. This content can include one or more of: the address of the user; the coordinates of the user; the description of the location of the user; the intended destination of the user; the estimated arrival time of the user; the speed of the user; any other information related to the current position of the user or his current route; a map of the position of the user, a map of the destination or a map of any other location inside a message. The data message may be one a number of pre-stored messages: for example, message 1 could read "I'm at [location] now." The [location] would be automatically filled in. Another useful pre-stored message could be "I should arrive at [estimated arrival time]". Again that time would be automatically inserted. The user can hence very simply send someone an appropriate message by selecting an appropriate message by selecting the relevant pre-stored message from a list of possible messages shown on the display.

Other features are that:

If the device includes a music player that plays music, then that music can be dimmed, faded out completely, or paused during the time a navigation instruction or navigation-related warning or message is played.

The device can use the wireless transceiver to receive traffic data via the mobile telephone; that data is then used by the device in route calculation and can also include elements that are shown on the display.

In one variant, the device is a PDA.

In another variant, the device is itself a mobile telephone.—i.e. device itself fully integrates a mobile telephone and there is no need to have an external mobile telephone at all. In this case, the wireless transceiver in the device is not used to connect to another mobile telephone, but instead to other types of devices (e.g. a remote control; a headset etc.) and may in fact be dispensed with entirely. All of the features described above are applicable to this variant. This variant will be particularly useful in the future as the cost of cellular telephony components falls and wireless communication functionality can then be integrated at reasonable cost into devices other than a dedicated mobile telephone.

Appendix 1

TomTom GO Product Specification

Introduction

The TomTom Go device ('Go') is a stand-alone fully integrated personal navigation device. It will operate independently from any connection to the vehicle.

Target Markets

Go is intended to address the general personal navigation market. In particular it is designed to extend the market for personal navigation beyond the "early adopter" market. As such it is a complete stand-alone solution; it does not require access to a PC, PDA or Internet connection. The emphasis will be on completeness and ease of use.

Although Go is a complete personal navigation solution; it is primarily intended for in vehicle use. The primary target market is anybody who drives a vehicle either for business or pleasure.

To successfully address this market Go must satisfy the following top-level requirements:

1. Acceptable price point—Appropriate compromise between product features and cost.
2. Simplicity—Installation and operation of Go will be simple and intuitive, all major functions should be accomplished by an average non PC-literate user without recourse to the product manual.
3. Flexibility—All map data and operating programs will be supplied on plug in memory cards. The device can easily be extended to cover different locales.
4. Reliability—Although in-car navigation systems are not considered safety critical components; users will come to rely on Go. It will be engineered to all relevant automotive environmental standards. In addition it will be tolerant to short GPS coverage outages.

Channels

Consumer electronics retail outlets

Automotive accessory outlets

Specialist car accessory fitting garages

Product Summary

Go is an in-vehicle personal navigation device. It is designed as an appliance, that is, for a specific function rather than a general purpose one. It is designed for the consumer after-sales automotive market. It will be simple to use and install by the end user, although a professional fitting kit will be optionally supplied.

The principal features are:

Built on standard commodity PocketPC 2002 components

Standard PocketPC 3.5" ¼ VGA transflective TFT LCD display mounted in landscape orientation ROMless soft-boot memory architecture Highly integrated ARM9 200 MHz CPU SD card memory slot for application and map data storage Integrated GPS receiver and antenna Integrated two axis accelerometer for simple dead reckoning Power, audio, debug and external GPS antenna connections made through docking connector on base of unit Embedded Linux OS with no GUI layer, application provides its own UI Very simple touch screen UT optimised for finger use High quality integrated speaker for voice instructions Internal rechargeable Li-Ion battery giving at least five hours of continuous operation Operating System Go will use a customised version of embedded Linux. This will be loaded from an SD card by a custom boot-loader program which resides in Flash memory Hard Buttons Go will have only one hard button, the power button. It is pressed once to turn on or off Go. The UT will be designed so that all other operations are easily accessible through the pen based UT.

There will also be a concealed hard reset button.

Architecture

Go architecture is based around a highly integrated single chip processor designed for mobile computing devices. This device delivers approximately 200 MIPs of performance from an industry standard ARM920T processor. It also contains all the peripherals required excluding the GPS baseband. These peripherals include DRAM controller, timer/counters, UARTs, SD interface and LCD controller.

The main elements of this architecture are:

Microprocessor running at 200 MHz

32 MB or 64 MB of fast synchronous DRAM (SDRAM) with low power self refresh. Arranged as two devices on a 32 bit wide 100 MHz bus SD card interface for all non-volatile storage including the OS (No RAM drive)

Native (bare metal) boot loader stored in 256 KB of NOR Flash. This Flash device will contain a boot sector which is write protected to store protected data such as unique product ID's and manufacturing data.

Debug UART (RS232 3V levels) connected to the docking connector

USB client for PC connectivity

Integrated GPS receiver

Integrated two axis accelerometer

Optional integrated Bluetooth transceiver for PDA and mobile phone connectivity

High quality audio through $I^2S$ codec and amplifier

The Go block diagram is at FIG. 7.

Power Management

Go will be powered from an integrated Li-Ion 2200 mAH rechargeable battery. This battery can be charged, and the device powered (even if the battery contains no charge) from an externally supplied +5V power source. This external +5V power source is supplied via the docking connector or a DC jack socket.

This +5V supply will be generated from the vehicle's main supply rail or from a mains adapter externally. The device will be turned on and off by a single button. When the device is turned off the DRAM contents will be presented by placing the RAM in self-refresh so that when switched on Go will resume from where it was switched off. There will also be a wake-up signal available through he docking connector, this can be used to auto-switch on Go when the vehicle ignition is switched on.

There will also be a small hidden reset switch.

System Memory Architecture

In contrast to conventional embedded devices which execute all the OS and application code in place from a large mask ROM or Flash device, Go will be based on a new memory architecture which is much closer to a PC.

This will be made up of three forms of memory:
4. A small amount of XIP (eXecute In Place) Flash ROM. This is analogous to the PC's BIOS ROM and will only contain a proprietary boot loader, $E^2$ emulation (for UID and manufacturing data) and splash screen bit maps. This is estimated to be 256 KB in size and would be on a slow 8 bit wide SRAM interface.
5. The main system memory, this is analogous to the PC's main memory (RAM). This will be where all the main code executes from as well as providing the video RAM and workspace for the OS and applications. Note: No persistent user data will be stored in the main system RAM like a PC) i.e. there will be no "Ram drive". This RAM will be exclusively connected to a 32 bit 100 MHz synchronous high-speed bus. Go will contain two sites for 16 bit wide 256/512 Mbit SDRAM's allowing memory configurations of 32 MB (16 bit wide) 64 MB 32 bit wide and 128 MB (32 bit wide).
6. Non-volatile storage, analogous to the PC's hard disk. This is implemented as removable NAND flash based SD cards. These devices do not support SIP. All the OS, application, settings files and map data will be permanently stored on SD cards Audio A 52 mm diameter speaker is housed in Go to give good quality spoken instructions. This will be driven by an internal amplifier and audio codec. Audio line out will also be present on the docking connector.

SD Memory Slot

Go will contain one standard SD card socket. These are used to load system software and to access map data.

Display

Go will use a transflective 3.5" TFT backlit display It will be a 'standard' ¼ VGA display as used by PocketPC PDAs, although in landscape format. It will also contain a touch panel and bright CCFL backlight.

Power Supplies
Power Supply—AC Adapter Socket
4.75V to 5.25V (5.00V+/−50%)@2A
Power Supply—Docking Connector
4.75V to 5.25V (5.00V+/−5%)@2A
Variants It shall be possible to assemble and test the following variants of Go:

Standard: Bluetooth Depopulated, 32 Mbyte RAM

In the Standard variant the Bluetooth function is not populated, and 32 Mbytes RAM is fitted.

Bluetooth Option (TomTom Plus Real Time Traffic Variant)

The product design includes a Bluetooth transceiver although it is not populated in the standard variant to minimise BOM cost. The design should ensure that all other functions (including GPS RF performance) operate without degradation when the Bluetooth function is operating. The Bluetooth transceiver can be used to send and receive data with a Bluetooth paired mobile telephone. On this way, the Go device can access real time traffic data obtained via a suitable mobile telephone (e.g. a GPRS or other data message enabled system) and can generate navigation instructions, and modify already generated navigation instructions, in dependence on traffic data received by the mobile telephone and sent by the mobile telephone to the Go device over the Bluetooth piconet. Although we specifically mention the ubiquitous Bluetooth system, any other data transfer mechanism can be used.

In addition to enabling the Go device to access real time traffic data received on a mobile telephone, the Bluetooth transceiver is used as part of the 'hands-free' mobile telephone functionality offered by the Go device, as described earlier.

64 Mbyte RAM Option (Variant)

The product design ensures that it is possible to fit 64 Mbyte RAM instead of 32 Mbyte.

Subassemblies

Go consists of the following electrical subassemblies, shown in FIG. 8.

RF Cable

The RF cable feeds the RF signal from an external GPS antenna (which connects to Go via the RF docking connector) to the RF PCB where the GPS module is situated.

External Connectors

Docking Connectors

Two Docking Connectors provide an interface to external Docking Stations.

Docking Connector #1 pinout

| Pin | Signal | Dir | Type | Description |
|-----|--------|-----|------|-------------|
| 1 | GND | — | — | Signal and power GND |
| 2 | GND | — | — | |
| 3 | DOCKSNS1 | I/P | PU | Docking Station Sense [0, 1] - These |
| 4 | DOCKSNS0 | I/P | PU | signals are connected to pull-up resistors within the unit. The Docking Station pulls either or both of these signals to GND to indicate the presence and type of Docking Station. |
| 5 | AUDIOL | O/P | | Audio line outputs (Left and Right) to |
| 6 | AUDIOR | O/P | | connect to car audio system. |
| 7 | MUTE | O/P | O/D | The unit pulls this line to GND to signal the car audio system to mute itself while the unit is issuing a voice command. |
| 8 | IGNITION | I/P | PD | Ignition sense. |
| 9 | DOCKPWR | I/P | PWR | +5 V power from the Docking Station |
| 10 | DOCKPWR | I/P | PWR | to simultaneously power the unit and charge the battery. |

PWR Power connection
O/D Open-Drain output
PU Pull-Up resistor within the unit
PD Pull-Down resistor within the unit Docking Connector #2 pinout

| Pin | Signal | Dir | Type | Description |
|-----|--------|-----|------|-------------|
| 1 | TXD | O/P | UART | 3 V logic level UART signals |
| 2 | RXD | I/P | UART | |
| 3 | RTS | O/P | UART | |
| 4 | CTS | I/P | UART | |
| 5 | GND | — | PWR | |
| 6 | nTRST | I/P | JTAG | CPU JTAG signals for test and |
| 7 | TMS | I/P | JTAG | configuration |
| 8 | TCK | I/P | JTAG | |
| 9 | TDI | I/P | JTAG | |
| 10 | TDO | O/P | JTAG | |

The RF Docking Connector allows connection of an external active GPS antenna via a Docking Station.

AC Adapter Socket

The AC adapter socket allows power to be supplied from a low cost AC adapter or CLA (Cigarette Lighter Adapter).

USB Connector

The USB connector allows connection to a PC by means of a standard mini USB cable.

SD Card Socket

A hard locking SD card socket suitable for high vibration applications supports SDIO, SD memory and MMC cards.

(Although Go provides hardware support for SDIO, software support will not be available at the time of product introduction)

Processor

The processor is the ARM920T based SOC (System on chip) operating at approx 200 Mhz.

RAM

Go will be fitted with RAM to the following specification:

| Type | SDRAM with low-power refresh ("mobile" SDRAM) |
| --- | --- |
| Total memory | 32 Mbyte (standard) or 64 Mbyte (future option) |
| Bus width | 32-bit |
| Minimum speed | 100 Mhz |
| Maximum self refresh current | 500 µA per device |
| Configuration | 2 × 16-bit wide CSP sites |

Flash Memory

Go will be fitted with a minimum of 256 kbyte of 16-bit wide Flash Memory to contain the following:

Boot loader code to enable loading of O/S from SD card

Factory set read-only protected manufacturing parameters (e.g. manufactured date) and unique ID (E2PROM emulation)

User specific settings (E2PROM emulation)

The following devices can be used depending on price and availability:

GPS Internal Antenna

The GPS internal antenna is attached directly to the RF PCB.

GPS External (Active) Antenna Switching

When an external antenna is connected via the RF Docking Connector, the GPS antenna source is automatically switched to the external antenna.

Accelerometer

A solid state accelerometer is connected directly to the processor to provide information about change of speed and direction.

Auxiliary Functions

Ignition Synchronization

Ignition Wakeup

A rising edge on the Docking Station IGNITION signal will wakeup the unit. The IGNITION signal may be connected to a 12V or 24V vehicle battery.

Ignition State Monitoring

The state of the Docking Station IGNITION signal is detected and fed to a GPIO pin to allow software to turn off the unit when the ignition signal goes low.

Standard Peripherals

The following peripherals will be included as standard with Go.

Simple docking shoe. Mounts Go and allows charging through a DC jack. No other connectivity is included in the simple dock.

Cigarette fighter power cable connecting to Go through the DC jack socket or simple docking shoe.

Mini USB cable for PC connectivity

Universal mains adapter for connection to DC Jack socket

Optional Peripherals

The following optional peripherals will be available at or after the time of launch of Go Active antenna kit. Contains a GPS active antenna and a docking shoe with GPS RF connector and cable fitted. For self installation when an external antenna is required.

Professional vehicle docking kit. For fitting by professional installation only. Allows direct connection to vehicle supply, audio system and active antenna via a vehicle interface box.

The invention claimed is:

1. A portable GPS navigation device, comprising:
a touch-sensitive display configured to display map information and navigation route instructions, if the navigation device is in a normal navigation mode;
a two-way wireless transceiver configured to connect the navigation device to a mobile telephone;
a processor configured to,
enable traffic data to be received by the mobile telephone for use by the navigation device in route calculation,
enable a user to control one or more functions of the mobile telephone through a graphical interface presented on the touch-sensitive display of the navigation device in place of map information and navigation instructions, and
cause one or more control signals to be sent to the mobile telephone via the two-way transceiver, if the touch-sensitive display is displaying said graphical interface, and
if the user touches said graphical interface, the control signals being configured to control said one or more functions of said mobile telephone;
an audio output configured to broadcast audible signals received from the mobile telephone via the two-way transceiver; and
a microphone configured to return data representing a voice to the mobile telephone via the two-way transceiver.

2. The device of claim 1, wherein the graphical interface includes one or more graphical icons, and the user selects one of the one or more graphical icons to cause the one or more control signals to be sent to the mobile telephone.

3. The device of claim 2, wherein one of the one or more graphical icons is an icon that, when selected by a touch action, causes an incoming voice call to be answered.

4. The device of claim 2, wherein one of the one or more graphical icons is an icon that, when selected by a touch action, causes a voice call to be ended.

5. The device of claim 2, wherein one of the one or more graphical icons is an icon that, when selected by a touch action, causes a text message to be displayed.

6. The device of claim 2, wherein one of the one or more graphical icons is an icon that, when selected by a touch action, opens a phonebook application on the device which the user can search for a required number using a keyboard shown on the touch-sensitive display.

7. The device of claim 6, wherein one of the one or more graphical icons is an icon that, when selected by a touch action, causes a number located in the phone book application to be sent to the mobile telephone and automatically dialed.

8. The device of claim 2, wherein one of the one or more graphical icons is an icon that, when selected by a touch action, causes a pre-stored home telephone number of the user to be automatically sent to the mobile telephone and dialed.

9. The device of claim 2, wherein one of the one or more graphical icons is an icon that, when selected by a touch action, causes an on-screen keyboard to be shown, into which a user enters a telephone number to be dialed.

10. The device of claim 2, wherein one of the one or more graphical icons is an icon that, when selected by a touch action, enables the user to at least one of search, select and call the telephone number of a local point of interest.

11. The device of claim 1, wherein the processor is configured to one of suppress voice navigation instructions during a voice call and replace voice navigation instructions by beeps during a voice call.

12. The device of claim 1, wherein the processor is configured such that, during a voice call, voice navigation instructions from the device are suppressed.

13. The device of claim 1 further comprising:
a digital music player, wherein the device being configured such that, during a voice call, music that is being played back on the audio output is in one of paused, the music volume is reduced to a lower volume and the music volume is reduced to zero.

14. The device of claim 1, wherein the processor is configured such that, during a voice call, the graphical information shown on the touch-sensitive display is simplified.

15. The device of claim 14, wherein instead of a 3D moving-map display, large simple navigation arrows are shown by the touch-sensitive display.

16. The device of claim 14, wherein during a voice call, an indicator is shown by the touch-sensitive display to indicate a phone call is in progress.

17. The device of claim 16, wherein touching the indicator will end the voice call.

18. The device of claim 16, wherein touching the indicator will cause a phone-related menu to be displayed.

19. The device of claim 18, wherein the phone related menu displays one or more of the following options hang up, change the sound volume and transfer the phone audio back to the phone so that sound comes from the normal mobile telephone speaker instead of the device speaker.

20. The device of claim 1, wherein during a voice call, a signal is output by the device to an external audio system, with the effect that the external audio system one of reduces volume and pauses during the phone conversation.

21. The device of claim 1, wherein during a phone call, a volume control of the device, normally used to specify the volume of driving instructions, is used to influence the volume of the phone conversation.

22. The device of claim 1, wherein when a phone call comes in, an "incoming call" ringtone is played by the device at least one of instead of and in addition to the "incoming call" action of the mobile telephone phone.

23. The device of claim 1, wherein the touch-sensitive display is configured to display details about an incoming call.

24. The device of claim 23, wherein the details about the incoming call include one or more of a phone number of a caller, the caller name, and other information based on at least one of the number and information available about the incoming phone call.

25. The device of claim 24, wherein audible information is provided based on the details about the incoming call.

26. The device of claim 25, wherein the audible information is generated using computer-generated speech synthesis.

27. The device of claim 1, wherein the processor is configured to accept an incoming voice call one of after a number of seconds, and a number of rings.

28. The device of claim 1, wherein the touch-sensitive display is configured to display a location linked to a caller, and the processor is configured to allow the location to be used as a new navigation destination.

29. The device of claim 28, wherein the touch-sensitive display is configured to display the location on a map.

30. The device of claim 28, wherein the processor is configured to add the location to a database for later use in a navigation application.

31. The device of claim 28, wherein the location linked to the caller is one or more of a part of an information about the caller, a location stored in a database and retrieved by using a number or a name of the caller as a key, the database being associated with one of the mobile telephone, the navigation device, and accessible via on-line services and retrievable by request to a mobile telephone operator.

32. The device of claim 1, wherein if a data message is received by the mobile telephone, the mobile telephone sends the data message to the device.

33. The device of claim 32, wherein if the data message is received by the device, an indicator appears on the touch-sensitive display to indicate receipt of the data message.

34. The device of claim 32, wherein one of a warning sound, a ringtone and a pre-recorded sound fragment plays over the audio output of the device upon receipt of the data message.

35. The device of claim 32, wherein when a data message arrives, the device uses computer-generated speech to read out information relating to the message, including one or more of the name of the sender and the content of the message.

36. The device of claim 32, wherein the processor is configured to enable a user to create a new data message including content generated by navigation software running on the device.

37. The device of claim 36, wherein the content generated by the navigation software includes one or more of an address of the user, coordinates of the user a description of a location of the user a destination of the user an estimated arrival time of the user a speed of the user information related to the current position of the user, a current route of the user a map of the current position of the user, a map of the destination of the user and a map of any other location inside a message.

38. The device of claim 1, wherein the device includes a music player that plays music that is one of dimmed, faded out completely, and paused during the time one of a navigation instruction a navigation-related warning and a navigation related message is played.

39. The device of claim 32, wherein the data message is one of a SMS message, a MMS message and, any text message format and multi-media format.

40. The device of claim 32 in which the data message is any kind of data content that can be used by the device.

41. The device of claim 1, being a portable navigation device configured to be mounted against an internal surface of a vehicle using a suction mount.

42. The device of claim 1, wherein the wireless transceiver is a short-range wireless transceiver configured to be paired with a compatible mobile telephone.

43. The device of claim 1, wherein the wireless transceiver receives traffic data via the mobile telephone, and the navigation device uses the traffic data in route calculation and shows some of the traffic data on the touch-sensitive display.

44. The device of claim 2, wherein activating or controlling one or more functions is disabled if the vehicle is driving above a certain speed.

45. A portable GPS navigation device, comprising:
- a touch-sensitive display configured to display map information and navigation route instructions, if the navigation device is in a normal navigation mode;
- a two-way wireless transceiver configured to connect the navigation device to a mobile telephone;
- a processor configured to,
    - enable a user to control one or more functions of the mobile telephone through a graphical interface presented on the touch-sensitive display of the navigation device in place of map information and navigation instructions, and
    - cause one or more control signals to be sent to the mobile telephone via the two-way transceiver, if the touch-sensitive display is displaying said graphical interface, and
    - if the user touches said graphical interface, the control signals being configured to control said one or more functions of said mobile telephone;
- an audio output configured to broadcast audible signals received from the mobile telephone via the two-way transceiver,
    - wherein a function of receiving an incoming voice call and a function of entering a telephone number into the navigation device via the two-way transceiver are disabled if the vehicle is driving above a predetermined speed; and
- a microphone configured to return data representing a voice to the mobile telephone via the two-way transceiver.

46. The portable navigation device of claim 45 further comprising providing a prompt to the user when the navigation device disables the function of receiving an incoming voice call and the function of entering a telephone number into the navigation device.

* * * * *